Figure 1:
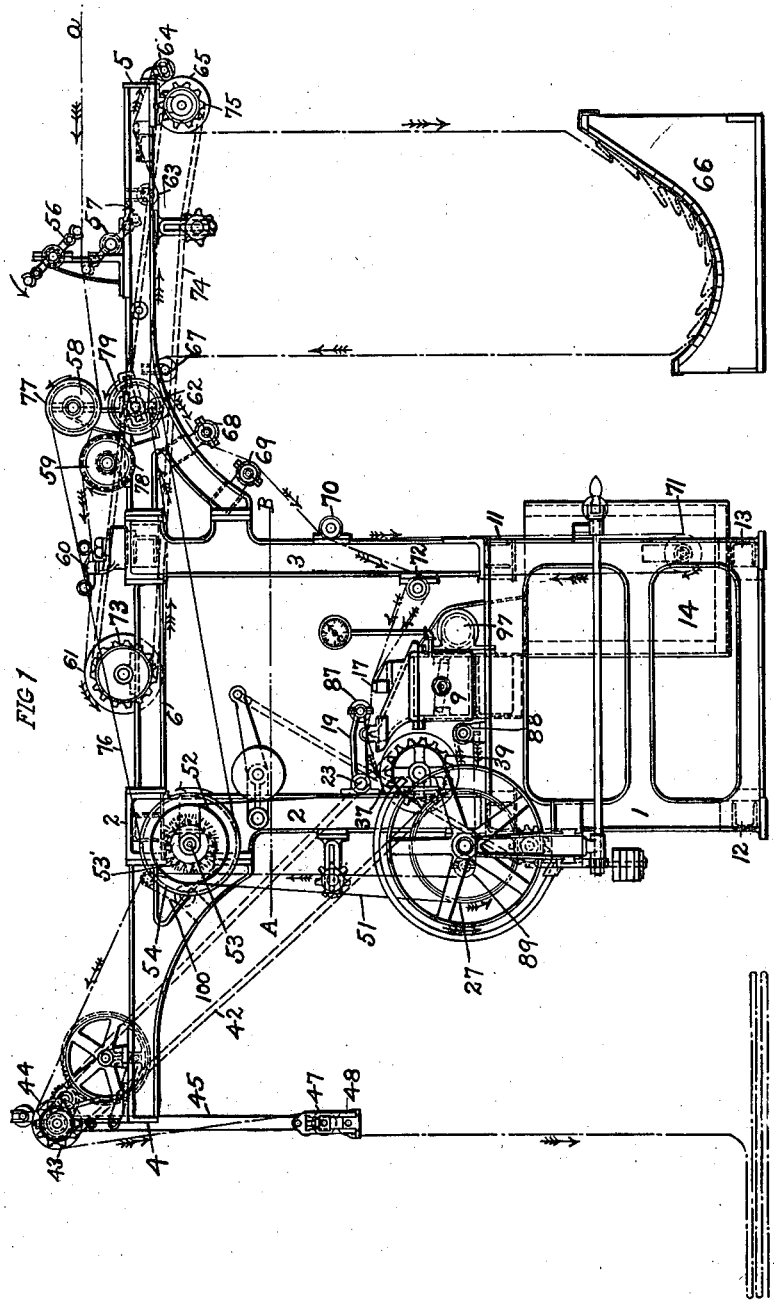

D. GESSNER.
APPARATUS FOR EXTRACTING LIQUID FROM CLOTH.
APPLICATION FILED AUG. 15, 1908.

996,637.

Patented July 4, 1911.
5 SHEETS—SHEET 1.

WITNESSES
Oscar Ascher
J. E. Hardenbergh, Jr.

INVENTOR
David Gessner
By Gifford & Bull
ATT'YS.

D. GESSNER.
APPARATUS FOR EXTRACTING LIQUID FROM CLOTH.
APPLICATION FILED AUG. 15, 1908.
996,637.
Patented July 4, 1911.
5 SHEETS—SHEET 2.
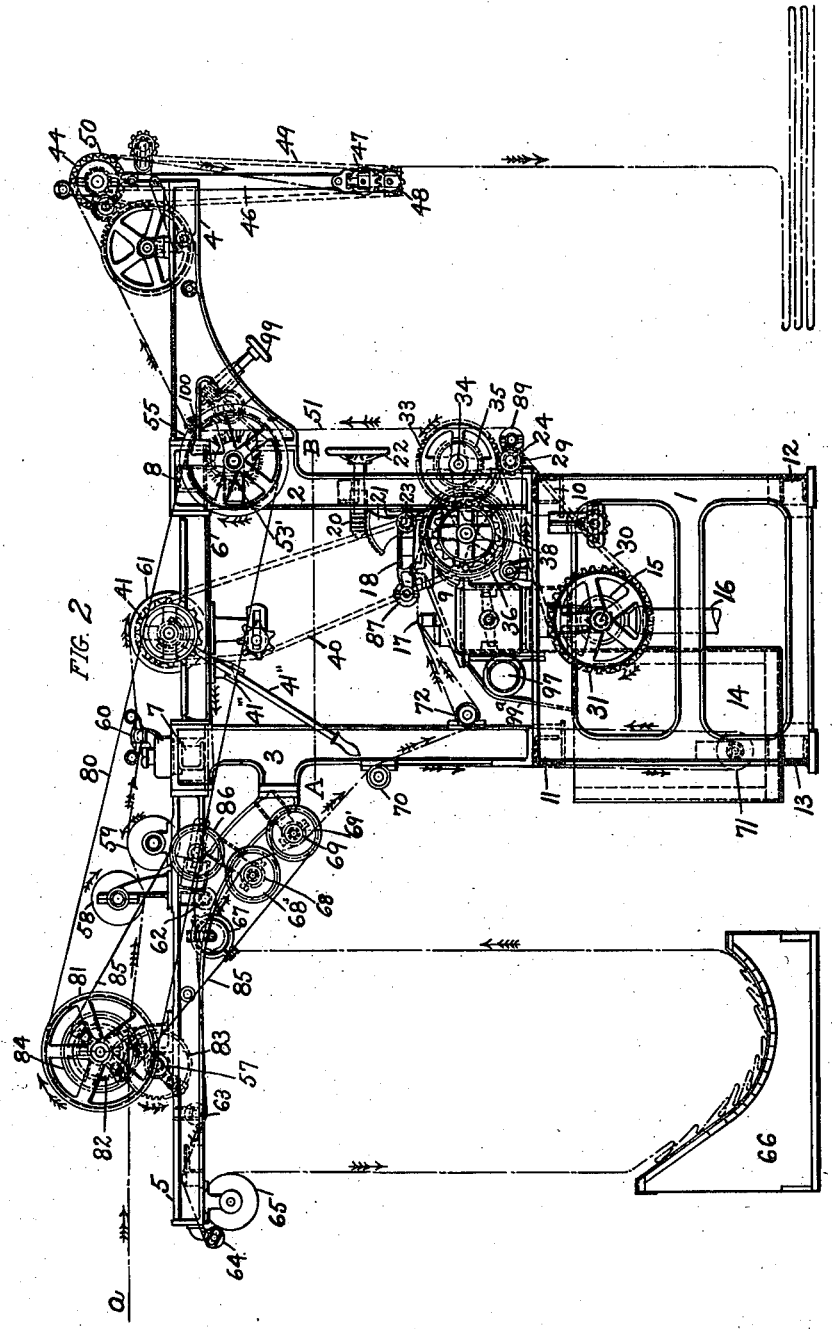
WITNESSES
Oscar Ascher
J. E. Hardenbergh, Jr.
INVENTOR
David Gessner
By Gifford & Bull
ATTYS.

D. GESSNER.
APPARATUS FOR EXTRACTING LIQUID FROM CLOTH.
APPLICATION FILED AUG. 15, 1908.
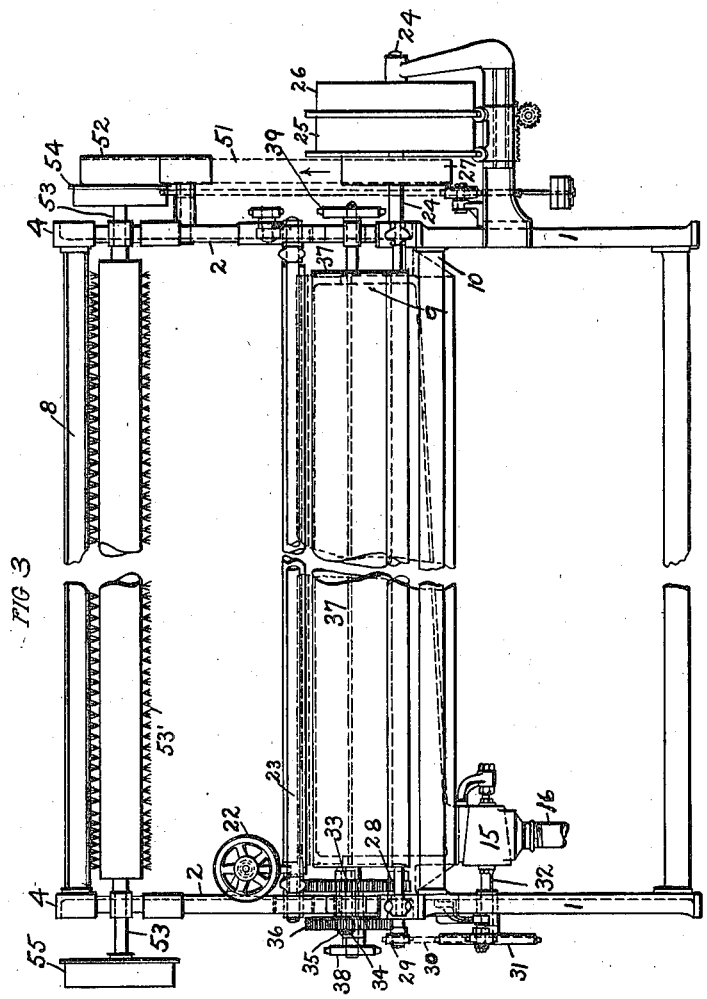

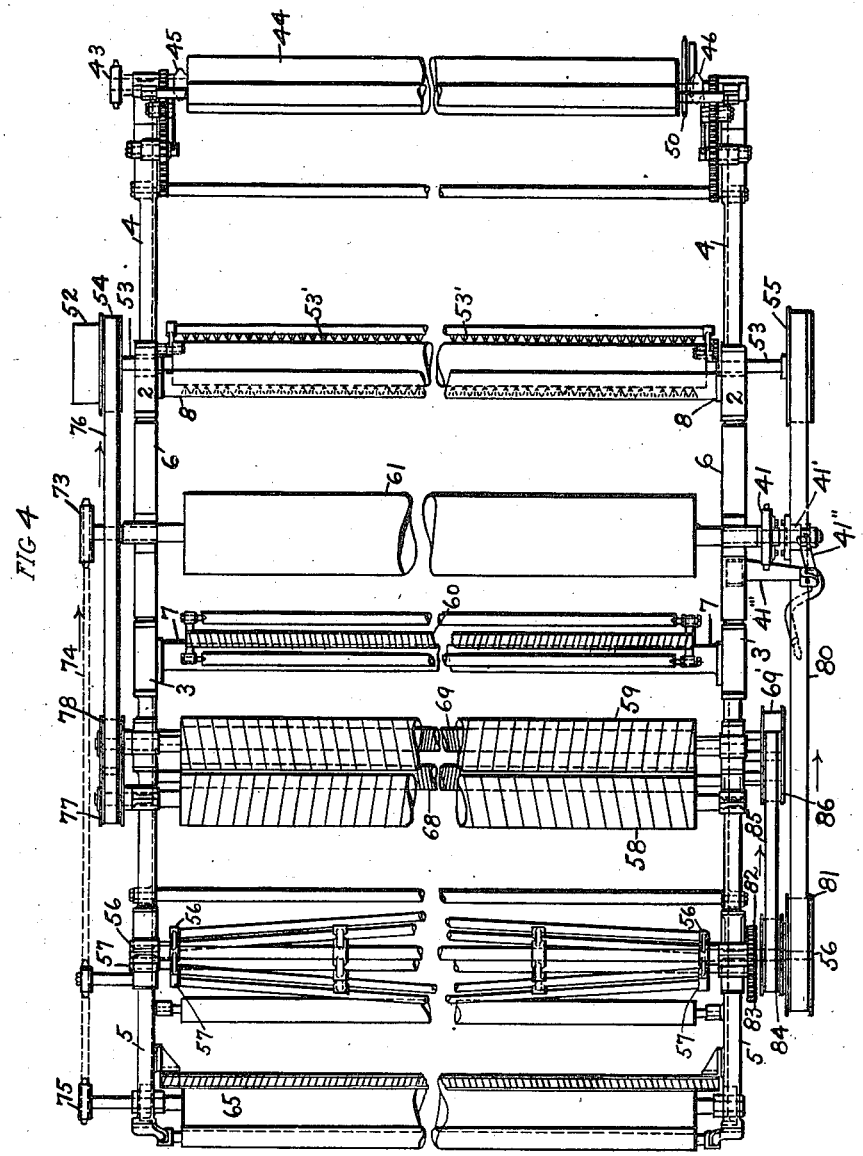

D. GESSNER.
APPARATUS FOR EXTRACTING LIQUID FROM CLOTH.
APPLICATION FILED AUG. 15, 1908.
996,637.
Patented July 4, 1911.
5 SHEETS—SHEET 5.
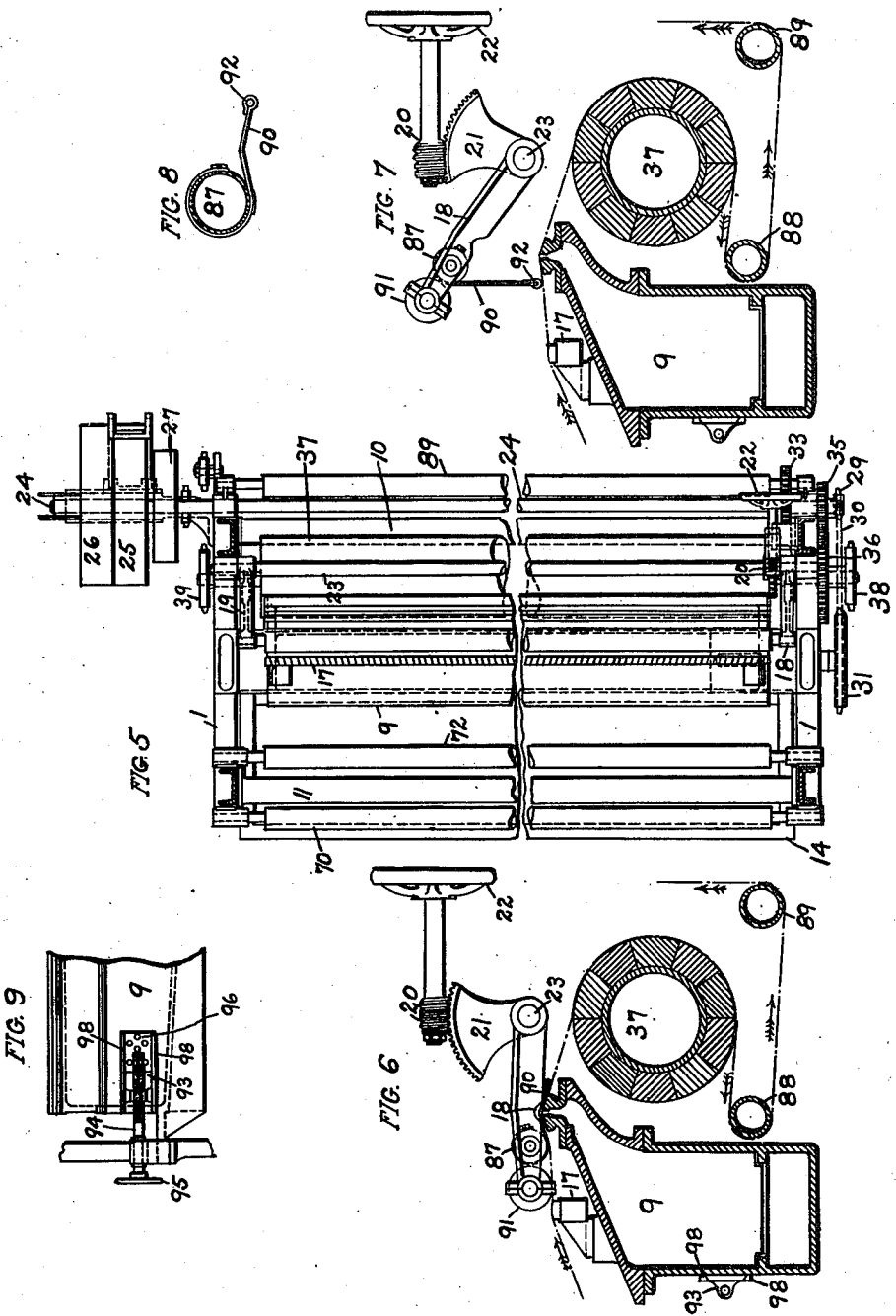
WITNESSES
INVENTOR

UNITED STATES PATENT OFFICE.

DAVID GESSNER, OF WORCESTER, MASSACHUSETTS.

APPARATUS FOR EXTRACTING LIQUID FROM CLOTH.

996,637. Specification of Letters Patent. Patented July 4, 1911.

Application filed August 15, 1908. Serial No. 448,739.

*To all whom it may concern:*

Be it known that I, DAVID GESSNER, a citizen of the United States, and a resident of Worcester, in the county of Worcester and State of Massachusetts, have invented a new and useful Improvement in Apparatus for Extracting Liquid from Cloth, of which the following is a specification.

My invention relates to apparatus for extracting liquid from cloth, such as shown, for instance, in Patent No. 883536 dated March 31, 1908, and is an improvement thereon.

Figure 1 is an end view of my machine showing its driving end with a cloth-cradle fronting the machine at the right. Fig. 2 shows the opposite end of my machine with the cradle fronting the machine at the left. Fig. 3 is a rear view of my machine. Fig. 4 is a top view of my machine above the line A, B, shown in Figs. 1 and 2. Fig. 5 is a top view of my machine below the line A, B. Figs. 6 and 7 represent a cross-section of my improved vacuum chamber, with the cover overlying the cloth shown in two different positions. Fig. 8 is a detail of the cover 90 and its roll 87, shown in Figs. 1, 2, 6 and 7. Fig. 9 is a detail of the slide 93 and its connections, shown in Fig. 7, whereby the vacuum may be varied.

In the accompanying drawings, 1, 1, are the main frames of my machine to which are fastened a superstructure consisting of uprights 2 and 3, with horizontal extensions 4 and 5. These uprights 2 and 3 are tied together at the top through connecting pieces, or ties 6, and the girts 7 and 8. The main frames which are tied together by the girts 10, 11, 12 and 13, carry in front, resting on top of girt 13, a trough 14, which may contain water, and on top, centrally between the uprights 2 and 3, the vacuum chamber 9. At the bottom of the vacuum chamber 9 is located the exhaust port 15, with the discharge pipe 16 for the passage of extracted liquid. On top of the vacuum chamber is located the spreader bar 17, and overhanging its slotted mouth piece are the movable arms 18 and 19 that are keyed to a shaft 23 carrying on one end the segment 21 operated by the worm 20 through the hand wheel 22.

24 is the main driving-shaft of the machine carrying on one end the fast and loose pulleys 25 and 26 and a third pulley 27, and on its opposite end, just inside of the upright 2, the pinion 28, and at its extreme end the small sprocket 29. The sprocket 29, through the sprocket chain 30, drives the large sprocket 31 fast upon the arbor 32 of the revolving discharge cock within the exhaust port 15. The pinion 28 drives into the gear 33 immediately above it and fast upon an arbor 34 within a bearing fastened to the rear upright 2, and outside of the upright 2 this arbor carries the small gear 35 which meshes into a larger gear 36 fast upon the draft roll 37. This draft-roll 37 carries on one end the sprocket 38 and upon its opposite end sprocket 39. The sprocket 38 through a chain 40 drives up to the sprocket 41, whereas the sprocket 39 drives through a chain 42 up to the sprocket 43 upon the rear top draft-roll 44 from the bearings of which are suspended the folder-arms 45 and 46. The folder-arms 45 and 46 carry at their lower ends the final delivery-rolls 47 and 48. The final delivery-roll 48 receives its motion through a chain 49 from a sprocket 50 fast upon roll 44. Just inside of the driving pulley 25 a belt 51 drives up from the pulley 27 to the pulley 52 keyed to the end of brush shaft 53. Immediately inside of pulley 52 upon the brush shaft 53 is keyed a second pulley 54 and upon the opposite end of the brush shaft 53 is keyed the pulley 55.

The sprocket 41 (Figs. 2 and 4) turns loosely upon the shaft of the center feed-roll 61 and has some clutch pins meshing with other clutch pins in the clutch member 41' which is operated by the lever handle 41'' pivoted in the bracket 41''', so that by operating the lever handle 41'' the center feed-roll 61 can be made to revolve and carry the cloth, or not, while the machine is in operation. Upon the opposite end of the center feed-roll 61 is the sprocket 73 which, through a chain 74, drives the sprocket 75 fast upon the journal of the front feed-roll 65.

The pulley 54 upon the brush shaft 53 through the belt 76 drives the pulleys 77 and 78 fast upon the large scroll rolls 58 and 59; the pulley 79 simply being a take-up or belt tightener for the belt 76. On the other side of the machine, the pulley 55 on the brush shaft 53 drives through the belt 80 the pulley 81 fast upon the end of beater shaft 56, which also carries the gear 82 which meshes into the gear 83 immediately below and fast upon the end of beater shaft 57. Just between the pulley 81 and the gear 82 upon the beater shaft 56, is fastened the pulley 84 which, through the belt 85, drives the small pulleys 68' and 69' fixed upon the ends of the small scroll rolls 68 and 69 (Figs. 2, 4) the slack of the belt 85 being taken up by the take-up pulley 86.

The cloth a comes in the form of a rope from the washing machine and is drawn through an eye suspended from the ceiling, not shown in the drawing, but placed some distance from the machine and directly central with the same, and practically in line with the top of feed-roll 61. It first passes in the direction of the arrow between the beaters 56 and 57, which, by beating against it, partially open the rope. It then passes between the large scroll rolls 58 and 59 which run at a high velocity of speed and open it still more completely, so that by the time it passes through the swivel-rigging 60 onto the center-feed-roll 61, the cloth shall have been opened out in full width, and in that shape it passes around the roll 61, over idler 62 and under idler 63, around idler 64, over the front feed-roll 65 and thence down to the cradle 66 on the floor. From the cradle 66 the cloth passes upward again over and around friction-roll 67, onward between the small scroll-rolls 68 and 69 to the idler 70, whence it passes in the direction of the arrow, either straight down and around the roll 71 within the tank or trough 14, up over idler roll 72, over the stretcher bar 17 on top of the vacuum chamber 9; or, it may pass directly from the roll 70 to the roll 72, under it, onto the stretcher bar 17, without passing through the tank 14. From the stretcher-bar 17, the cloth passes under the cover-roll 87, over the slotted mouth of the vacuum chamber 9, on and around the draft-roll 37, around idlers 88 and 89, upward past the brush 53', over the rear top draft-roll 44 to the final delivery rolls 47 and 48, and from there in folds to the floor.

While the operation of opening the cloth at the top entrance of the machine, and before its passage into the cloth cradle 66, and from there onward to the vacuum chamber, and from there out of the machine over the draft-roll 37 and top draft-roll 44, is one continuous operation, I, nevertheless deem it of great advantage to have the first two feed-rolls 61 and 65 under such control that, by the operation of the hand-lever 41", these two feed-rolls can be made to work intermittently while the main feed-roll 37 and the top delivery roll 44 (with its accompanying delivery rolls 47 and 48) continue at a uniform rate of speed. This is done because different kinds of cloth treated in this machine will necessarily vary in extent of lengthwise stretch during their passage over the slotted mouth of the machine. The greater the vacuum used for extracting the liquid, or the more flimsy the goods to be treated, the greater this lengthwise stretch of the cloth at that point. Supposing, for instance, this lengthening process of the cloth during its passage through the machine to amount to 5% on a certain class of goods, and the feed of the cloth to be 25 yards per minute; then, while the draft-rolls deliver 100 yards of goods in four minutes, there will be directly in front of the vacuum chamber 105 yards by that time; that is to say, 100 yards delivered by the feed-roll 65 plus the five yards additional caused by stretching in length at the mouth of the machine. Therefore, as soon as this accumulation of stretched cloth seems more than is safe to have there, the operator throws the clutch member 41' out of mesh with the clutch member of sprocket 41, by pressing the hand lever 41" inward, thus stopping feed-rolls 61 and 65 until the draft-roll 37 has caught up with and has disposed of this accumulation, whereupon the lever 41' may be reversed. If it were not for this, or a similar arrangement between the feed-rolls located beyond the vacuum chamber and those located before it, it would be necessary to have two separate operations and apparatus, namely: one for opening the cloth and one for extracting it.

It will be noticed that in the Patent No. 883536 above referred to, the cloth is placed before the machine in the form of a roll, and when this is not done the cloth must be placed before it in a folded condition; that is to say, in full width. This means that the rope of cloth coming from the washing machine has got to be untwisted and opened out in full width, either by hand or by a scutching machine or opener fastened to the ceiling of the room. Whether it be done by hand entirely, or through a scutching machine, extra men will be necessary to do this; or, if the same men who run the extractor are expected to do this work, then the extractor has got to be stopped while these men open out the cloth either by hand or through the scutching machine. Then, only, may they place it before the extractor and extract it.

In my machine, the cloth is taken directly from the washing machine, thrown into a truck in the rope form, in which it comes from the washer, and then it is passed through an eye (not shown in the accompanying drawings) suspended from the ceiling, and passed into my machine as above described, the opening and extracting taking place at one and the same time. The only thing done to interrupt the forward feed of the cloth before it reaches the vacuum chamber being an occasional throwing in and out of mesh of the clutch member 41' through the lever 41", and for the reason stated. All this time, however, the operation beyond the vacuum chamber is one uninterrupted one, thus making it possible to do in one hour what it now takes more than two hours to do, or to do with two men in the same time that it now takes four men to do.

By placing the feed-roll 37 close to the vacuum chamber 9, and by making the top portion of the chamber containing the slotted mouth overhanging the same, I shorten the distance between the slotted mouth of the machine and the line of contact of the cloth with the feed-roll 37, where the same begins to pull, by more than one half of the distance allowed in other machines of this class, and I thus reduce very materially the stretch in the cloth above referred to, but taken care of by the clutch arrangement 41, 41' and 41''. Instead of a revolving roll with strips of cloth attached to it, as shown in Patent No. 883536, to cover the cloth as it passes over the slotted mouth of the vacuum chamber, I use roller 87 to which I attach a broad strip of leather 90, and this roller I hold fixed in its bearings in the swinging arms 18, 19, in such a manner that I can pay out, from time to time, a little more of this cover, as fast as it becomes worn by the friction of the cloth passing under it, where it overlies the slotted portion, or mouth, of the vacuum chamber.

Immediately in front of the cover-roll 87, I locate another roller, which has cut in its circumference sharp threads, or scrolls, making of it a spreader roll by having these threads diverge from the center out toward the ends. However, this roll 91 is held stationary in the arms 18, 19, the same as cover-roll 87. As the sharp edges of the scrolls of this metal stretcher-roll 91 become worn and dull, I ease up on its bearings and turn it a trifle and then fasten it again, so as to present a new portion of its surface for action against the cloth, which thus becomes smoothed and freed from wrinkles between the stretcher-bars 17 and 91 immediately before entering under the cover 90 fastened to the cover-roll 87. The rear edge of cover 90 is looped, and this loop is filled all the way across with steel balls, or heavy shot, making it quite heavy there, yet withal, yielding, so that the cover will lie snug to the cloth.

When introducing the end of a piece of cloth, the arms 18, 19, are thrown up, as shown in Fig. 7, and after the end is placed securely upon and around roll 37, the arms are dropped again, as in Fig. 6.

In Fig. 9, is shown a sliding cover 93 between gibs 98 fast upon the vacuum chamber 9. This slide acts as a regulator and is operated by a screwthreaded spindle 94, with a small hand-wheel 95 attached to it at the end, where the spindle 94 is held in bearings at one of the uprights of the frame. As shown, this slide has been drawn past the perforations 96 drilled through the wall of the vacuum chamber 9, exposing in all six holes. By moving this slide 93, either to cover these perforations, or to expose them, a higher or a lower vacuum may be maintained within the chamber 9, according to the number of holes exposed to the outer air. This regulator or slide permits, therefore, the use of a varying vacuum, according to the class of goods under treatment. Although shown as attached directly to the vacuum chamber I do not wish to limit myself to such direct attachment. This is a very desirable feature, as is also the addition of tank 14 which can be partially filled with water. 99ª is a guard to conduct any drip from the surface of the vacuum chamber over the pipe 97 so that it will drip into the trough 14.

In the operation of my machine in the mill, the cloth cannot always be had when wanted, and it frequently happens that there is a period of no cloth, and then again a period of plenty of cloth, according to when a lot of cloth comes from the washers. Now, cloth fresh from the washer and reeking with water will be more easily and more thoroughly extracted in a vacuum extractor than cloth that has been waiting for some time to be taken to the vacuum extractor. In the latter case, the cloth has had a chance to drain off a great portion of its water, so that the upper portion of a big truck load of wet cloth may be fairly well drained while the lower portion of this same truck load may be quite full of water. When such a pile of cloth is passed into the machine, it will be found that that portion of the cloth which has been partially drained will be less well extracted than the portion underlying it, which still contains a great amount of water, because the portion that has been drained will allow more air to pass along with the outgoing water than the portion that is filled full of water; hence, the wetter the goods immediately before extracting, the more thoroughly will they be extracted, and the more they have become drained, the less easy will it be to extract them. By using a water tank 14, all cloth, whether it be well drained, or otherwise, is passed or drawn once more through a body of water and allowed to take up all it wants to before reaching the mouth of the machine thus facilitating the extracting process and insuring greater uniformity of work.

99 (Fig. 2) is a hand-wheel and worm arrangement at the rear of upper extension arm 4, which controls a swing finger 100 for throwing the cloth in and out of contact with the brush 53' in its passage to the top draft-roll 44. This arrangement is used when finishing face goods. When finishing worsteds and other goods not requiring brushing, the cloth may be run directly from idler 89 to top draft-roll 44.

The principal points of improvement in my machine consist, first, in combining with it means for opening the cloth from the rope form in which it comes from the washing machine, and an arrangement for intermittently stopping and starting the feed-rolls which lie in the path of the cloth before it reaches the cradle in front of the machine, respectively the vacuum chamber, in order to properly take care of the slack of the cloth accumulating between them and the vacuum chamber; my next improvement consists in reducing as much as possible this stretch of the cloth by making the vacuum chamber overhang the back draft-roll in order to shorten to a minimum the distance between the latter and the vacuum chamber. Further, in rewetting the cloth by taking it through a tank of water before reaching the vacuum chamber, in order to insure greater thoroughness and uniformity of work; and, further, in the convenient and economical arrangement of using a detachable cloth-cover with one end fastened to a roll or bar, located upon a swing arm (as 18 or 19) but placed in advance of the mouth of the vacuum chamber, which cover may be used up piecemeal; and, finally, in attaching a slide 93 to form a regulator for varying and adjusting the vacuum within the chamber 9.

Having thus described my invention, what I claim and desire to secure by Letters Patent is:

1. In a machine for extracting liquid from cloth, in combination, a vacuum chamber, a set of beaters to which the cloth is delivered from the washing machine in the form of a rope, means for rotating said beaters to partially open the rope, and mechanism between said beaters and the vacuum chamber for opening the cloth its full width before it is fed to said chamber.

2. In a machine for extracting liquid from cloth, in combination, a vacuum chamber, a set of beaters to which the cloth is delivered from the washing machine in the form of a rope, means for rotating said beaters to partially open the rope, a set of scroll rolls for opening the cloth its full width, a draft roll for drawing the cloth between the beaters and scroll-rolls and delivering it to the vacuum chamber.

3. In a machine for extracting liquid from cloth, in combination, a vacuum chamber, a set of beaters to which the cloth is delivered from the washing machine in the form of a rope, means for rotating said beaters to partially open the rope, a set of scroll-rolls for opening the cloth its full width, and a swivel rigging for keeping the cloth in a straight path, and a draft-roll for drawing the cloth between said parts and delivering it to the vacuum chamber.

4. In a machine for extracting liquid from cloth, in combination, a vacuum chamber, mechanism for opening the cloth from rope form to its full width, a cradle, and a draft-roll for delivering the cloth in full width to said cradle.

5. In a machine for extracting liquid from cloth, in combination, a vacuum chamber, mechanism for opening the cloth from rope form to its full width, a cradle, a draft-roll for delivering the cloth in full width to said cradle, and a set of scroll-rolls interposed between the cradle and the vacuum chamber.

6. In a machine for extracting liquid from cloth, in combination, a vacuum chamber, mechanism for opening the cloth from rope form to its full width, a cradle, a draft-roll for delivering the cloth in full width to said cradle, a friction-roll and a set of scroll-rolls interposed between the cradle and the vacuum chamber.

7. In a machine for extracting liquid from cloth, in combination, a vacuum chamber, members for opening the cloth from rope form and means intermediate said members and said vacuum chamber whereby the cloth is loaded with liquid additional to that which it already contains before reaching the machine.

8. In a machine for extracting liquid from cloth, in combination, a vacuum chamber, members for opening the cloth from rope form and a water tank through which the cloth is passed intermediate said members and said vacuum chamber.

9. In a machine for extracting liquid from cloth, in combination, a vacuum chamber, means for opening the cloth from rope form to full width, means for delivering the same to the vacuum chamber, and other means for taking it away from the vacuum chamber, all in one continuous operation.

10. In a machine for extracting liquid from cloth, in combination, a vacuum chamber, members for opening the cloth from rope form to full width, a draft-roll for drawing the cloth between and past said members, means for intermittently rotating said roll, a draft-roll for drawing the cloth from the vacuum chamber, and means for continuously rotating said last named roll.

11. In a machine for extracting liquid from cloth, in combination, a vacuum chamber, members for opening the cloth from rope form to full width, two draft-rolls one before and the other beyond the vacuum chamber, means for continuously operating said rolls, and additional means for intermittently interrupting the first named draft-roll.

12. In a machine for extracting liquid from cloth, in combination, a vacuum chamber, members for opening the cloth from rope form to full width, a draft-roll for drawing the cloth between and past said members, a draft-roll for drawing the cloth over and past the vacuum chamber, and a power shaft for operating said opening members and draft-rolls continuously.

13. In a machine for extracting liquid from cloth, in combination, a vacuum chamber, members for opening the cloth from rope form to full width, a draft-roll for drawing the cloth between and past said members, a draft-roll for drawing the cloth over and past the vacuum chamber, a power shaft for operating said opening members and draft-rolls continuously, and additional means for intermittently interrupting the first named draft-roll.

14. In a machine for extracting liquid from cloth, in combination, a vacuum chamber, members for opening the cloth from rope form to full width, a draft-roll for drawing the cloth between and past said members, a clutch for connecting and disconnecting said roll with its driving mechanism, and means for continuously drawing the cloth over and past the vacuum chamber.

15. In a machine for extracting liquid from cloth, in combination, a vacuum chamber, members for opening the cloth from rope form to full width, a draft-roll, a cradle interposed between said draft-roll and the vacuum chamber, and means for continuously drawing the cloth over and past the vacuum chamber.

16. A machine for extracting liquid from cloth, comprising a vacuum chamber having its mouth offset relatively to its body.

17. A machine for extracting liquid from cloth, comprising a vacuum chamber having an inclined top wall overhanging the body of the chamber.

18. A machine for extracting liquid from cloth comprising a vacuum chamber having its mouth to one side of the vertical axis through said chamber.

19. In a machine for extracting liquid from cloth, in combination, a vacuum chamber, a draft-roll, the portion of said vacuum chamber containing the mouth overhanging said roll.

20. In a machine for extracting liquid from cloth, in combination, a vacuum chamber, a flexible cover adapted to overlie the cloth and the mouth of said chamber, and a holder to which one end of said cover is fastened, said roll or bar being placed in advance of the mouth of the vacuum chamber.

21. In a machine for extracting liquid from cloth, in combination, a vacuum chamber, an exhaust connected therewith and an air inlet whereby the maximum capacity of the exhaust may be reduced.

22. In a machine for extracting liquid from cloth, in combination, a vacuum chamber, said vacuum chamber having an opening, other than the slotted mouth of the chamber, leading to the atmosphere, and means for wholly or partially closing said opening.

23. In a machine for extracting liquid from cloth, in combination, means for opening the cloth from rope form, a rest for the slack of opened cloth, a vacuum chamber and guides from the rest to the vacuum chamber.

24. In a machine for extracting liquid from cloth, in combination, means for opening the cloth from rope form, a rest for the slack of opened cloth, a vacuum chamber and a tension between the rest and the vacuum chamber.

25. In a machine for extracting liquid from cloth, in combination, means for opening the cloth from rope form, a rest for the slack of opened cloth, a vacuum chamber and a spreader between the rest and the vacuum chamber.

26. In a machine for extracting liquid from cloth, in combination, mechanism for opening the cloth from rope form containing a feed, a vacuum chamber, a draft roll coöperating therewith and means whereby said feed may be arrested while said draft roll proceeds.

27. In a machine for extracting liquid from cloth, in combination, mechanism for opening the cloth from rope form containing a feed, a vacuum chamber, a draft roll coöperating therewith, means whereby said feed may be arrested while said draft roll proceeds and an intermediate slack rest.

In testimony whereof, I have hereunto signed my name in the presence of two subscribing witnesses.

DAVID GESSNER.

Witnesses:
FRANK E. RAFFMAN,
CHARLES S. JONES.